United States Patent [19]

Gordon

[11] 4,196,897
[45] Apr. 8, 1980

[54] CLAMPING DEVICE

[76] Inventor: Carroll Gordon, 12 Vista Dr., Danville, Calif. 94526

[21] Appl. No.: 940,790

[22] Filed: Sep. 8, 1978

[51] Int. Cl.² .............................................. B25B 1/24
[52] U.S. Cl. ..................................... 269/99; 269/157; 269/239; 269/246
[58] Field of Search ................. 269/157, 254 R, 315, 269/317, 319, 303, 286, 229, 239, 237, 231, 99; 279/35, 123, 46, 6, 1 L, 1 ME

[56] References Cited

U.S. PATENT DOCUMENTS

| Re. 29,533 | 2/1978 | Parsons | 279/123 |
| 930,235 | 8/1909 | Sanders | 269/157 |
| 3,129,950 | 4/1964 | Galler | 279/1 ME |
| 3,827,685 | 8/1974 | Wennes | 269/231 |

Primary Examiner—Robert C. Watson
Attorney, Agent, or Firm—Fitch, Even & Tabin

[57] ABSTRACT

A clamping device or clamp block which may be used to secure a work piece in place on rotary tables, mill tables, fixtures and the like, comprises a unitary block having a slot cut substantially across one dimension of the block to form a principal body portion and a jaw portion interconnected by a hinge portion at the end of the slot, a hole being formed through the body portion of the clamp parallel with the slot to receive a bolt for securing the clamp in place, another tapped hole being formed through the body perpendicular to the slot for receiving a threaded screw to act upon the jaw.

10 Claims, 6 Drawing Figures

U.S. Patent  Apr. 8, 1980  4,196,897
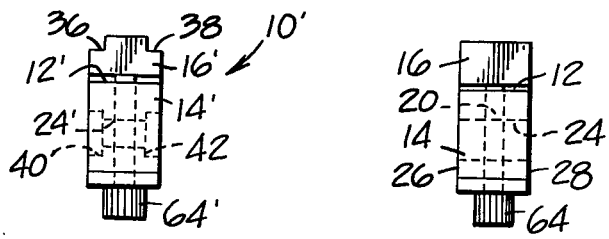
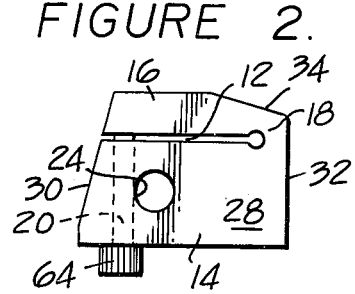
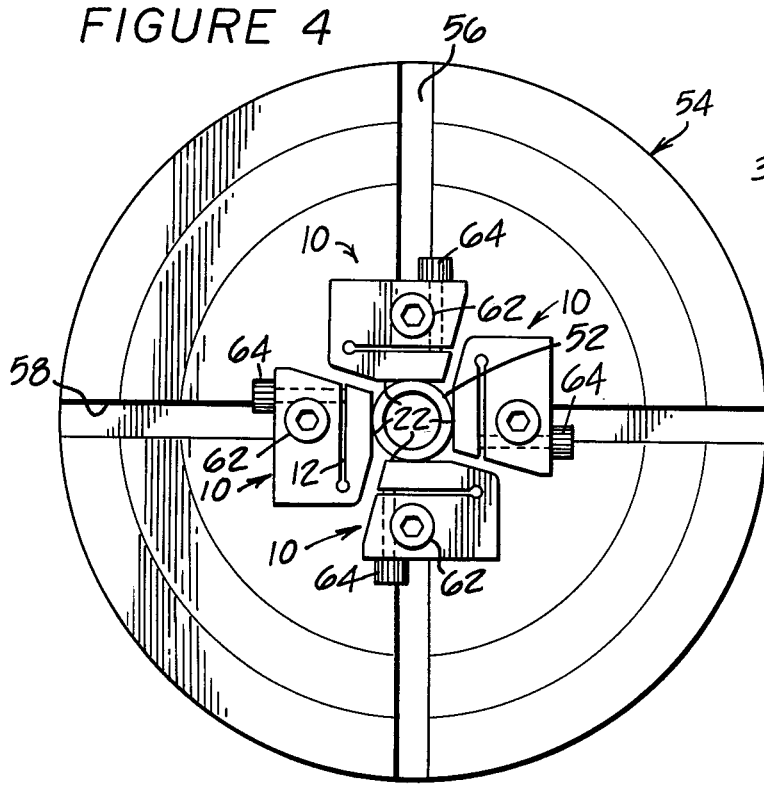
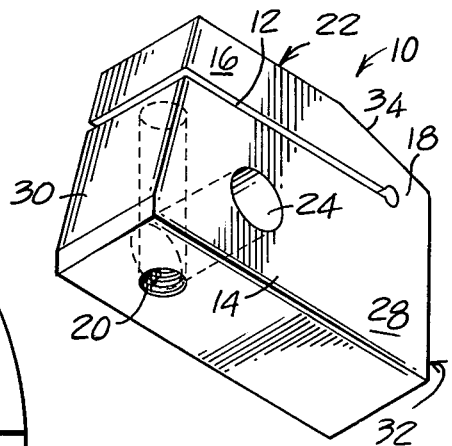
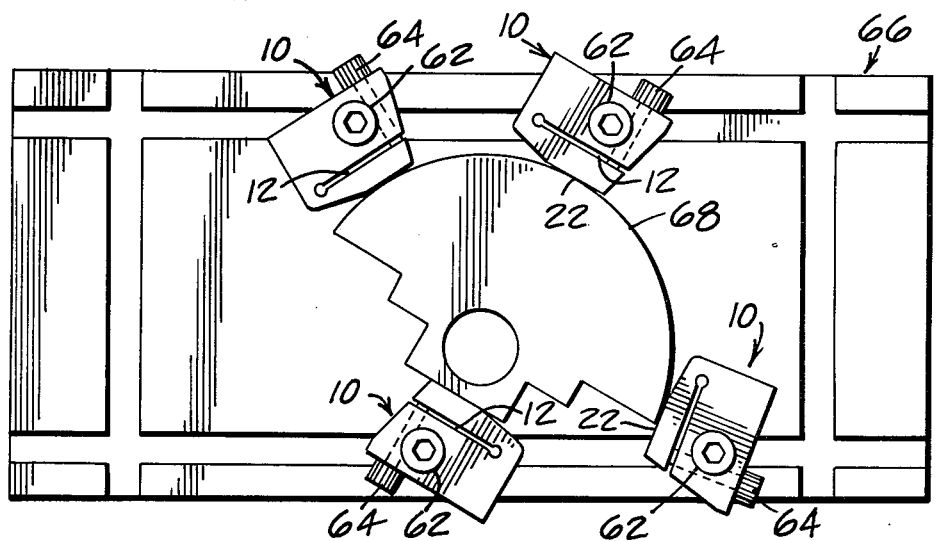

CLAMPING DEVICE

The present invention relates to a clamping device or clamp block of a type used in machine operations, the clamp block being of unitary construction and including a movable jaw suitable for clamping interaction with a work piece. Preferably, a plurality of the clamp blocks are used in combination or one or more of the clamp blocks may be used in combination with other clamping means.

In most machining operations, it is necessary to securely fix a work piece in place upon a table or other work surface. Examples of surfaces to which work pieces are secured include rotary tables, mill tables, fixtures or face plates and lathes, etc. Usually, the work piece must be secured upon the surface to expose a selected portion of the work piece upon which work is to be performed. In addition to securely fixing the work piece in place, it is often necessary or desirable to provide fine adjustment in the position of the work piece. For example, when a work piece is secured to a rotary table, accurate alignment of a selected portion of the work piece with the axial center of the rotary table may facilitate machine operations upon the work piece.

In the past, it has been common to employ clamps which overlap portions of the work piece in order to secure it in place upon such surfaces. In such applications, a bolt may pass through a clamping plate and be secured either in a tapped hole formed in the surface or by a T-shaped retainer arranged in one or more slots of a rotary table or mill table for example. In any event, such clamping devices are generally awkward since they apply force downwardly upon the work piece. Initially, it is difficult to accurately adjust the lateral position of the work piece upon the surface. Further, once the work piece is secured by such overlapping clamps, the clamps often interfere with certain machine operations such as milling which may require that a complete surface of the work piece be exposed.

Other clamping devices include body portions which are secured to a work table, fixture or the like, a movable jaw being separately formed and movable relative to the body for engaging the work piece. Such clamping devices tend to be of relatively complex construction since the jaw must be accurately positioned relative to the body while being movable by suitable adjusting means. Thus, such clamping devices are often relatively large and expensive, the large size of the devices often interfering with performance of various machining operations.

Accordingly, there has been found to remain a need for a clamping device of particularly simple and compact construction providing a means for securing a work piece in place in a variety of applications while providing not only clamping force for securing the work piece but also providing adjustment for accurately locating the work piece.

SUMMARY OF THE INVENTION

It is therefore an object of the invention to provide a unitary clamping device or clamp block suitable for overcoming one or more problems of the type outlined above.

It is a further object of the invention to provide a unitary clamping device formed from a single block by a slot passing substantially through one dimension of the block to form a body portion and a movable jaw interconnected by an integral hinge portion at the end of the slot, a tapped hole passing through the body portion of the block perpendicular to the slot to receive an adjusting screw for interaction with the jaw. The clamping device preferably includes means for securing it in place upon a selected table, such as a bolt passing through a hole in the body portion of the device parallel with the slot.

It is an even further object of the invention to provide such an integral clamping device or clamp block having a configuration permitting a plurality of the devices to be nested together in order to precisely secure a relatively small work piece.

It is another object of the invention to form each clamping device or clamp block with parallel smooth surfaces to permit the device to be reversed for example to adapt it for use in a greater variety of applications.

Additional objects and advantages of the invention are made apparent in the following description having reference to the accompanying drawing.

BRIEF DESCRIPTION OF THE DRAWING

FIG. 1 is a perspective view of a clamping device or unitary clamp block constructed in accordance with the present invention.

FIG. 2 is a plan view of the unitary clamp block.

FIG. 3 is an end view of the clamp block showing the end surface of the block through which the slot is entirely cut.

FIG. 3A is a view similar to FIG. 3 while illustrating exemplary variations possible in the design of the clamp block.

FIG. 4 is a view of a plurality of clamp blocks according to the present invention used in combination upon a rotary table for securing a work piece of small diameter.

FIG. 5 is a view of a plurality of clamp blocks according to the present invention employed upon a mill table for securing a work piece of uneven configuration.

DESCRIPTION OF THE PREFERRED EMBODIMENTS

The present invention relates to a unitary clamping device or clamp block useful in a variety of applications, particularly machine operations, for securing work pieces in place upon various surfaces.

A unitary clamp block of the type contemplated by the present invention is indicated at 10 in FIG. 1. As noted above, a number of variations are possible within the construction of the clamp block according to the present invention. However, the clamp block essentially includes an elongated slot 12 dividing the clamp block 10 into a body portion 14, preferably comprising a substantial portion of the block, and jaw portion 16, the jaw portion being interconnected with the body portion 14 by an integral hinge portion 18 formed by a portion of the clamp block remaining at one end of the slot 12. A tapped hole 20 is formed through the body portion of the block in perpendicular and intersecting relation with the slot 12 in order to receive a threaded screw for moving the jaw portion 16 relative to the body portion 14. The jaw portion 16 includes a face 22 which is preferably configured for clamping interaction with a suitable work piece.

Since the present clamp block is contemplated for use in precise machinery tool operations, it is necessarily formed of hard material preferably steel which is hardened after the block is formed in the manner described below.

Two exemplary applications for the clamp block are described below and illustrated in FIGS. 4 and 5. In any event, it is necessary to provide means for securing the clamp block in place upon a work surface such as a rotary table, mill table, fixture or the like. Any type of clamping device could be employed for this purpose. However, it is preferably contemplated that the clamp block 10 be secured to the work surface by a bolt passing through a hole 24 formed parallel with the slot 12 and preferably closely adjacent the tapped hole 20.

Referring also to FIGS. 2 and 3, it may be seen that the clamp 10 is formed with opposed, normally horizontal surfaces 26 and 28. Preferably, both of these surfaces are smooth to permit reversal of the clamp block which may be desirable in order to adapt the clamp block for use in different applications.

In addition, referring particularly to FIGS. 1 and 2, opposed end surfaces 30 and 32 are tapered in order to permit a nested configuration of a plurality of the clamp blocks as will be described in greater detail below. In any event, the end surface 30 through which the slot 12 is cut is tapered across almost the entire dimension of the block 10. The other end surface 32 includes only a limited tapered portion 34 in order to leave adequate material within the block for forming the hinge 18. However, having reference for example to FIG. 4, it may be seen that the tapered configuration of the end surfaces 30 and 32 it is particularly adapted to facilitate nesting of a plurality of the clamp blocks in order to adapt them for securing a work piece of particularly small size.

Before proceeding with a description of examplary applications for the clamp block, it is again noted that numerous variations and modifications are possible within the design of the unitary clamp block. Initially, the body portion of the clamp block could be secured in place by a variety of clamping means. A bolt passing through the hole 24 is merely a preferred clamping means of particularly simple design. In addition, the face 22 of the jaw may be configured in order to better adapt it for engaging any of a variety of work pieces. For example, in some applications, it may be desirable to secure a work piece in place while maintaining it in spaced apart relation above the surface upon which it is mounted. For such an application, the clamp block 10' of FIG. 3A is illustrated with recesses 36 and 38 formed along the upper and lower edges of the jaw face. With such an arrangement, a work piece could be disposed within either recess and held in place by clamping force developed within the block. Opposed recesses 36 and 38 permit the clamp block to be used in this manner while also permitting it to be reversed as described above.

In addition, the clamp block 10' of FIG. 3A includes a similar hole 24' for receiving a bolt to secure the body of the clamp block against a supporting table surface. However, in the embodiment of FIG. 3A, counterbores 40 and 42 are formed at opposite ends of the hole 24'. In this manner, the head of a securing bolt may be arranged in one of the counterbores to present a smooth surface along the top of the clamp block even when it is secured in place upon a work surface of the type described in FIGS. 4 and 5. Such a variation may be desirable in order to eliminate interference with milling equipment or the like employed across the entire exposed surface of a work piece. Here again, opposed counterbores are provided in order to permit use of this feature while also permitting reversible disposition of the clamp block. However, it is noted that with one of the counterbores being arranged adjacent a work surface to which the clamp block is to be secured, it may be desirable to employ an annular spacer (not shown) within the counterbore in order to provide a more solid coupling between the clamp block and a bolt securing it to a work surface.

In operation, one clamp block 10 according to the present invention may be employed in combination with other clamp means for securing a work piece in place upon a work surface. However, it is preferably contemplated to secure a work piece in place upon a work surface by using a plurality of the clamp blocks. Such a combination is illustrated in FIGS. 4 and 5. Referring initially to FIG. 4, a tubular work piece of small diameter is indicated at 52 with four clamp blocks 10 being employed to secure the work piece in an upright position on a rotary table 54. The tapered end surface 30 and 32 for each of the clamp blocks 10 permit them to be closely nested as illustrated in FIG. 4. However, it will also be apparent from FIG. 4 that the clamp blocks 10 could also be respectively positioned closely adjacent the periphery of the rotary table 54 in order to secure a work piece nearly as large as the rotary table itself.

The rotary table 54 includes cross T-slots 56 and 58. A clamping bolt 62 is passed through the hole 24 of each clamp block 10 and engaged with suitable T-shaped means (not shown) for engagement with one of the T-slots 56 and 58. Accordingly, each of the clamping bolts 62 may be tightened in order to fix the position of the body portion for each of the clamp blocks. Preferably, the size of the holes 24 closely approximates the outer diameter of the clamping bolts 62 in order to prevent any play or undesirable movement in the clamp block.

The work piece 52 is initially positioned upon the rotary table in approximately the desired position. The jaw faces 22 of the clamp blocks 10 are then brought into contact with the work piece and the position of the clamp block is fixed by the clamping bolt 62. At this time, the work piece may still be lifted out from between the clamp blocks. Clamping force is applied by jack screws 64 which are arranged in the tapped holes 20. Preferably, the threads in the tapped holes 20 and on the jack screws 64 are relatively fine in order to facilitate fine adjustment over the jaw portions 16. As the jack screws 64 are tightened, they urge the jaw portion 16 against the work piece in order to firmly secure it in place.

Fine adjustment over the position of the work piece may also be accomplished by manipulation of the jack screws. For example, the jack screw of one clamp block may be loosened while tightening the jack screw on an opposed clamp block in order to reposition the work piece in one direction. Thus, the clamp blocks include fine adjustment means for accurately positioning the work piece and firmly securing it in place.

FIG. 5 illustrates the use of a similar plurality of clamp blocks employed on a mill table 66 for securing another work piece 68 of uneven configuration. FIG. 5 merely illustrates that the clamp blocks may also be employed to firmly secure and even permit fine adjustment over the position of such an unusually configured work piece.

The clamp blocks may also be employed in combination with a fixture plate in order to provide a clamping assembly for securing a work piece of any configuration. In such a combination, holes would be drilled and tapped in the fixture plate in alignment with each of the holes 24 after the clamp blocks are arranged in engagement with the work piece. Clamping bolts could be inserted through the clamp blocks to secure them in the same manner described above with reference to FIG. 4.

Additional variations and modifications are of course possible within the scope of the present invention in addition to the variations illustrated in FIG. 3A. For example, the thickness or other dimensions of the entire block could be substantially varied for different applications. A thick block might be used to provide a jaw face of increased dimension while a thinner block might be used in applications where space is critical. Accordingly, the scope of the present invention is defined only by the following appended claims.

What is claimed is:

1. A unitary clamping device for positioning a work piece upon a work surface comprising a clamp block, a slot extending partially through the block to divide the block into a body portion and a jaw portion interconnected by an integral hinge portion at the end of the slot, a tappered hole being formed through the body of the block perpendicular to and intersecting the slot for receiving a threaded jackscrew to adjust the jaw portion and clamping means for securing the body portion of the unitary block to the work surface.

2. The clamping device of claim 1 wherein said clamping means comprises a hole formed within the body portion of the block parallel with the slot to receive a clamping bolt for engagement with an opening in the work surface.

3. The clamping device of claim 2 wherein said tapped hole intersects said slot generally adjacent the unhinged end of the jaw portion.

4. The clamping device of claim 1 wherein the block is formed with smooth opposite sides permitting reversible arrangement of the clamping device of the work surface.

5. The clamping device of claim 1 wherein the block is tapered to facilitate nesting of a plurality of clamping devices in close relation to each other.

6. The clamping device of claim 1 wherein said jaw portion is formed with a face adapted for clamping engagement with the work piece.

7. The clamping device of claim 6 further comprising a plurality of said clamping devices each being secured to the work surface in spaced apart relation to have their jaw faces in clamping engagement with the work piece.

8. The clamping device of claim 7 wherein the work surface is provided with a plurality of T-slots, each clamping device having a hole formed through its body portion parallel to the slot for receiving a clamping bolt to secure the respective clamping devices upon the work surface.

9. The clamping device of claim 7 wherein the work surface is a rotary table.

10. The clamping device of claim 1 wherein the block is formed with smooth opposite surfaces, a hole passing through the body portion between the smooth surfaces and parallel with the slot to receive a clamping bolt for engagement with the work surface, at least one end of the hole being formed with a counter bore for receiving a bit portion of the clamping bolt.

* * * * *